United States Patent
Pines et al.

(10) Patent No.: US 8,696,129 B2
(45) Date of Patent: Apr. 15, 2014

(54) METHOD AND SYSTEM FOR COLOR CORRECTION FOR THREE-DIMENSIONAL (3D) PROJECTION

(75) Inventors: Joshua Pines, San Francisco, CA (US); William Gibbens Redmann, Glendale, CA (US); Mark J Huber, Burbank, CA (US)

(73) Assignee: Thomson Licensing, Issy les Moulineaux (FR)

( * ) Notice: Subject to any disclaimer, the term of this patent is extended or adjusted under 35 U.S.C. 154(b) by 763 days.

(21) Appl. No.: 12/803,847

(22) Filed: Jul. 8, 2010

(65) Prior Publication Data

US 2011/0019167 A1 Jan. 27, 2011

Related U.S. Application Data

(60) Provisional application No. 61/223,709, filed on Jul. 8, 2009, provisional application No. 61/299,808, filed on Jan. 29, 2010.

(51) Int. Cl.
*G03B 21/00* (2006.01)

(52) U.S. Cl.
USPC .......... 353/7; 353/8; 353/20; 353/30; 353/31; 353/85; 359/462; 359/464; 349/108; 349/109

(58) Field of Classification Search
USPC ......... 353/7–8, 20, 29–31, 69, 84–85, 94–95, 353/121–122; 349/5, 7–9, 58, 96, 108–109, 349/144; 359/458, 462, 464–466; 352/44, 352/53, 86, 52, 57, 59, 60; 396/322, 324, 396/331; 358/1.9
See application file for complete search history.

(56) References Cited

U.S. PATENT DOCUMENTS

| | | | |
|---|---|---|---|
| 4,464,028 A * | 8/1984 | Condon | 352/65 |
| 5,481,321 A * | 1/1996 | Lipton | 352/57 |
| 5,793,470 A * | 8/1998 | Haseltine et al. | 353/20 |
| 7,580,093 B2 * | 8/2009 | Rho | 349/108 |
| 7,604,348 B2 * | 10/2009 | Jacobs et al. | 351/159.6 |
| 7,857,455 B2 * | 12/2010 | Cowan et al. | 353/20 |
| 2005/0179775 A1 * | 8/2005 | Rodriguez et al. | 348/97 |
| 2006/0007460 A1 * | 1/2006 | Bogdanowicz et al. | 358/1.9 |
| 2010/0066813 A1 | 3/2010 | Jorke | |
| 2010/0149635 A1 | 6/2010 | Simon et al. | |

FOREIGN PATENT DOCUMENTS

| | | |
|---|---|---|
| WO | WO2008061511 | 5/2008 |
| WO | WO2009026888 | 3/2009 |

OTHER PUBLICATIONS

Jorke_etal_"INFITEC—A New Stereoscopic Visualisation Tool by Wevelenghth Multiplex Imaging," Conference Proceedings Elecronic Displays 2003, Sep. 2003.

* cited by examiner

*Primary Examiner* — Sultan Chowdhury
(74) *Attorney, Agent, or Firm* — Robert D. Shedd; Wan Yee Cheung (57) ABSTRACT

A method and system are disclosed for producing a color-corrected stereoscopic film for three-dimensional (3D) projection. Based on color measurements performed with different optical configurations of a projection system, at least one dye density adjustment can be determined for reducing discoloration in projected stereoscopic images that arises from one or more optical components in the projection system.

19 Claims, 6 Drawing Sheets

METHOD AND SYSTEM FOR COLOR CORRECTION FOR THREE-DIMENSIONAL (3D) PROJECTION

CROSS-REFERENCE TO RELATED APPLICATIONS

This application claims priority to U.S. Provisional Application Ser. No. 61/223,709, "Method and System for Color Correction for 3D Projection" filed on Jul. 8, 2009, and U.S. Provisional Application Ser. No. 61/299,808, "Method and System for Color Correction for Three-Dimensional (3D) Projection" filed on Jan. 29, 2010, both of which are herein incorporated by reference in their entirety.

TECHNICAL HELD

The present invention relates to a method and system for color correction for use in three-dimensional (3D) projection and a color-corrected stereoscopic film.

BACKGROUND

The current wave of 3-dimensional (3D) films is gaining popularity and made possible by the ease of use of 3D digital cinema projection systems. However, the rate of rollout of digital systems is not adequate to keep up with demand, partly because of the relatively high cost involved. Although earlier 3D film systems suffered from various technical difficulties, including mis-configuration, low brightness, and discoloration of the picture, they were considerably less expensive than the digital cinema approach. In the 1980's, a wave of 3D films were shown in the US and elsewhere, making use of a lens and filter designed and patented by Chris Condon (U.S. Pat. No. 4,464,028). Other improvements to Condon were proposed, such as by Lipton in U.S. Pat. No. 5,841,321. Subject matter in both references are herein incorporated by reference in their entireties.

One lens configuration uses a dual-lens arrangement (e.g., an upper lens for projecting images for one eye, and a lower lens for projecting images for the other eye) to simultaneously project left- and right-eye images of a stereoscopic image pairs laid out above and below each other on a same strip of film. The left- and right-eye images are encoded by passing each image through respective lens assemblies with separate filters (e.g., linear polarizers, circular polarizers, interference comb filters, etc.). The filter in each lens assembly encodes a respective right- or left-eye image so that a viewer or audience wearing glasses having corresponding left- and right-eye decoding filters (can also be referred to as viewing filters) will only see projected left-eye images through the left-eye viewing filter, and projected right-eye images through the right-eye viewing filter.

Due to the optical properties of the filters, which can be different for the left- and right-eyes, respectively, the combination of the encoding filters in the projection system and the appropriately matched decoding filters in the viewing glasses introduces wavelength dependencies into the transmission spectra, such that the resulting spectra are not flat compared to a system without the encoding and decoding filters. For example, one or more of the filters may attenuate certain bands or regions in the visible spectrum differently than other bands or regions. This wavelength dependence in the spectral transmission is perceived by an audience as a discoloration (e.g., the projected image appears 'greenish'), and is undesirable. The discoloration may be the same or different for each eye, (e.g., the left-eye takes on a yellowish cast and the right-eye takes a blue-ish cast), and can even differ spatially on the screen (e.g., points toward the center of the screen take on some cast, but points toward the corners of the screen take on even more).

These color errors detract from the 3D presentation for three reasons: First, the overall discoloration produces the impression that the 3D presentation through the glasses is of a lower quality than an 'untinged' projection; second, for those filter technologies that produce a color disparity between the projected images perceived by the audience's left and right eyes, there is a degree of discomfort and eyestrain for a viewer trying to accommodate the disparity; and third, a spatially varying discoloration across the screen can create a static on-the-screen artifact that renders the screen more apparent, thereby reducing or in some cases canceling the intended 3D stereoscopic effect. In the context of the discussion, discoloration can refer to the existence of the color shift or error due to the filters, and discoloration value can be used to refer to a quantity representing the amount of color shift or error introduced by the filters.

No known attempts to remedy this effect in a film-based 3D projection system. Although digital cinema projection systems may also suffer from one or more aspects of this problem, there may be an opportunity within a digital cinema server or light engine to provide a correction internally. For example, digital cinema projection system can make use of "measured color gamut data" in which primary colors that can be projected are measured (typically at the screen center) and discrepancies can be compensated for dynamically.

However, there is no such analog to this process in a film-based system. Thus, it is desirable to provide a film-based 3D presentation with improved quality (e.g., including color and brightness) that is at least competitive with that of the digital cinema presentations.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures. The drawings are not to scale, and one or more features may be expanded or reduced for clarity.

SUMMARY OF THE INVENTION

One embodiment of the present principles relates to a method for producing a stereoscopic film for use with a 3-dimensional (3D) projection system, the method includes obtaining information relating to an amount of dye density adjustment effective for reducing discoloration in projected images of the stereoscopic film, and producing the stereoscopic film based on at least the amount of dye density adjustment.

Another embodiment provides a plurality of images suitable for use with a three-dimensional (3D) projection system, the plurality of images include a first set of images and a second set of images, each image in the first set of images forming a stereoscopic image pair with an associated image in the second set of images. At least one of the two sets of images incorporates at least one dye density adjustment for at least partially compensating for discoloration resulting from at least one optical component of the 3D projection system.

DETAILED DESCRIPTION

One embodiment of the present invention relates to a method for producing a color-corrected stereoscopic film. In this embodiment, information relating to spectral transmission characteristics of the stereoscopic projection system is obtained, either by measurement, estimation, simulation, or otherwise provided. Specifically, the information relates to a "color error" or discoloration arising from one of more filters used for projecting stereoscopic images and for viewing the projected images. A dye density adjustment to one or more of three (cyan, yellow, and magenta) film dyes used for producing the stereoscopic film is determined based on the spectral transmission characteristics. A corresponding change in the density of the negative generated by a film recorder for each of the three dyes is also determined, such that a film print made from the film negative will be substantially color-corrected, thus minimizing the perception by the audience that the projected image is 'discolored'. This correction varies with each make of glasses and filters, and may differ for the left- and right-eye images.

Figure 1:
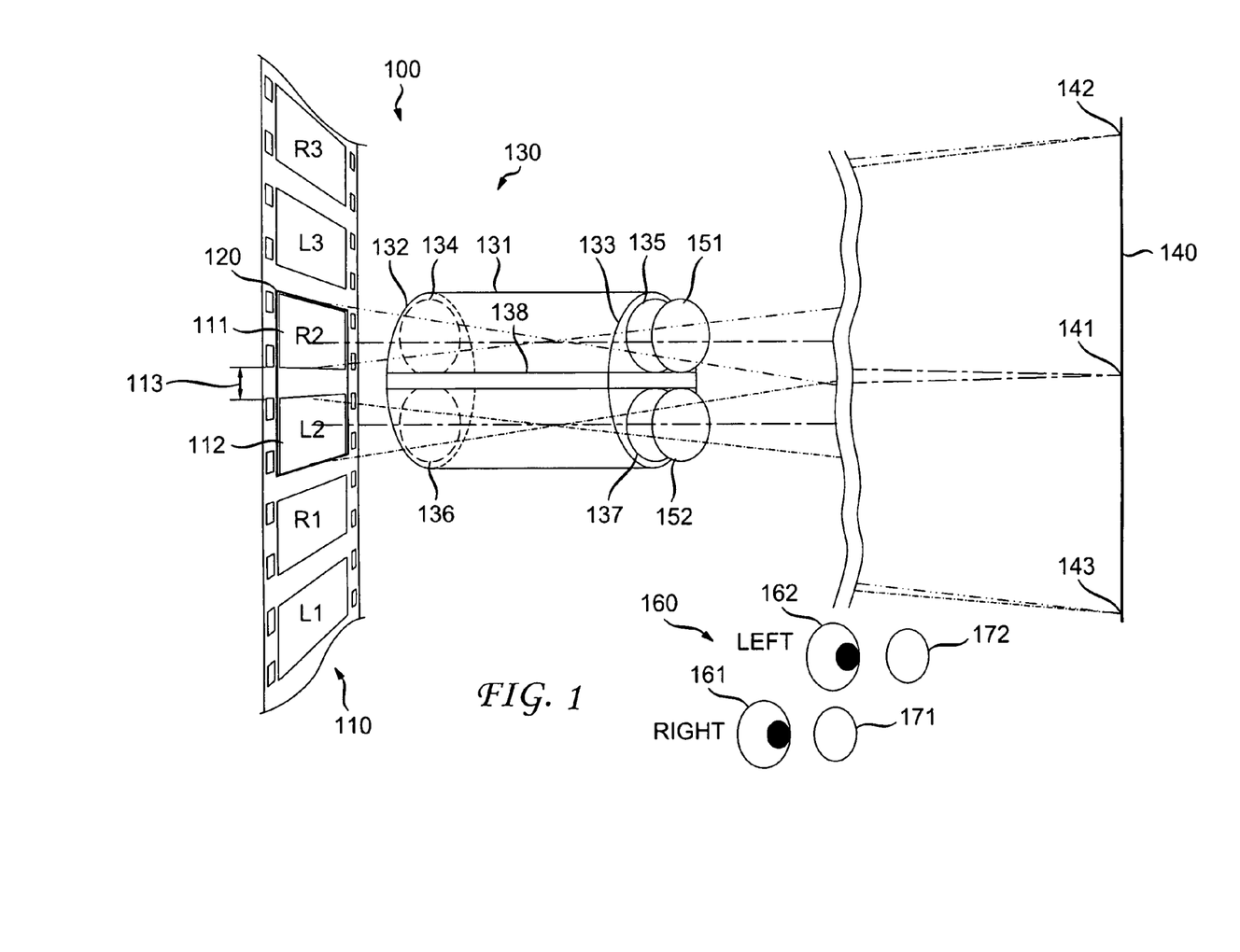
FIG. 1 is a drawing of a stereoscopic film projection system using a dual lens configuration.

To facilitate discussion of the present principle, a dual-lens projection system suitable for 3D film projection is shown in FIG. 1.

FIG. 1 shows an over/under lens 3D film projection system 100, also called a dual-lens 3D film projection system. Rectangular left-eye image 112 and rectangular right-eye image 111, both on over/under 3D film 110, are simultaneously illuminated by a light source and condenser optics (collectively called the "illuminator", not shown) located behind the film while framed by aperture plate 120 (of which only the inner edge of the aperture is illustrated, for clarity) such that all other images on film 110 are not visible since they are covered by the portion of the aperture plate which is opaque. The left- and right-eye images (forming a stereoscopic image pair) visible through aperture plate 120 are projected by over/under lens system 130 onto screen 140, generally aligned and superimposed such that the tops of both projected images are aligned at the top edge 142 of the screen viewing area, and the bottoms of the projected images are aligned at the bottom edge 143 of the screen viewing area.

Over/under lens system 130 includes body 131, entrance end 132, and exit end 133. The upper and lower halves of lens system 130, which can be referred to as two lens assemblies, are separated by septum 138, which prevents stray light from crossing between the two lens assemblies. The upper lens assembly, typically associated with right-eye images (such as image 111) has entrance lens 134 and exit lens 135. The lower lens assembly, typically associated with left-eye images (such as image 112) has entrance lens 136 and exit lens 137. Other lens elements and aperture stops internal to each half of dual lens system 130 are not shown, for clarity's sake. Additional lens elements, e.g., a magnifier following the exit end of dual lens 130, may also be added when appropriate to the proper adjustment of the projection system 100, but are also not shown in FIG. 1. Projection screen 140 has viewing area center point 141 at which the projected images of the two film images 111 and 112 should be centered.

The left- and right-eye images 112 and 111 are projected through left- and right-eye encoding filters 152 and 151 (may also be referred to as projection filters), respectively. Each audience member 160 is wearing 3D glasses, such that the right eye 161 of audience member 160 is looking through right-eye decoding filter 171 and the left eye 162 is looking through left-eye decoding filter 172. Left-eye encoding filter 152 and left-eye decoding filter 172 are selected and oriented to allow the left eye 162 to view only the projection of left-eye images on screen 140, but not the projection of right-eye images. Similarly, right-eye encoding filter 151 and right-eye decoding filter 171 are selected and oriented to allow right eye 161 to see only the projection of right-eye images on screen 140, but not left-eye images.

For example, right-eye encoding filter 151 may be a right-handed circular polarizer. Thus, the illumination used for projecting right-eye images such as image 111 is right-handed (or clockwise) circularly polarized before reflecting from screen 140. For use with polarization-based encoding filters (whether linear or circular), projection screen 140 must preserve polarization, e.g., as with a silver screen. When reflected by screen 140, the circular polarization of the projecting light is reversed, so that when viewed by audience member 160, the projection of the right-eye image 111 is left-handed (counterclockwise) circularly polarized. Thus, an appropriate selection for right-eye decoding filter 171 would be a left-handed (counterclockwise) circular polarizer, which would pass the projected right-eye image 111 from the screen 140 to the right-eye 161 of audience member 160.

Conversely, if a right-handed circular polarizer is selected for left-eye decoding filter 172, then the projected right-eye image 111 on the screen will not be viewable by left-eye 162, since the illuminating light for the right-eye image will become left-handed circularly polarized after reflecting off the screen. In this same configuration, if left-eye encoding filter 152 is a left-handed circular polarizer, then left-eye image 112, when projected and reflected from screen 140, will become right-handed polarized light, and thus be viewable through the-left-eye decoding filter 172 (a right-handed circular polarizer) and not visible through right-eye decoding filter 171 (a left-handed circular polarizer).

Other suitable combinations for encoding filters 151 and 152 and decoding filters 171 and 172 include linear polarizers and interference comb filters. Examples of interference comb filters are those manufactured by INFITEC GmbH, of Ulm, Germany, for use in stereoscopic display systems. The INFITEC filters each have three passbands, where the left-eye filters admit a reddish spectral band R1, greenish band G1, and bluish band B1; and the right-eye filters admit distinct bands R2, G2, and B2, wherein the bands admitted for the left- and right-eyes are mutually exclusive and each trio of passbands, R1, G1, B1 and R2, G2, B2 is sufficient to display a full-color image. Additional information for these interference comb filters can be found in an article by H. Jorke and M. Fritz, "INFITEC—A New Stereoscopic Visualisation Tool by Wavelength Multiplex Imaging," Conference Proceedings ELECTRONIC DISPLAYS 2003, September 2003; ISBN 3-924651-95-7, and in PCT applications by B. Straub: WO2008/061511 "Stereo Projection with Interference Filters" and WO2009/026888 "System for Reproducing Stereographic Images", all of which are herein incorporated by reference in their entirety.

A side effect of all known encoding/decoding filter pairs 151/171 and 152/172 is that in transmission mode, each pair does not have a flat spectral transmissivity. That is, over the range of wavelengths pertinent to human vision, each filter pair discolors the projected image to some degree. As mentioned above, audiences can be extremely critical of such effects.

Figure 2:
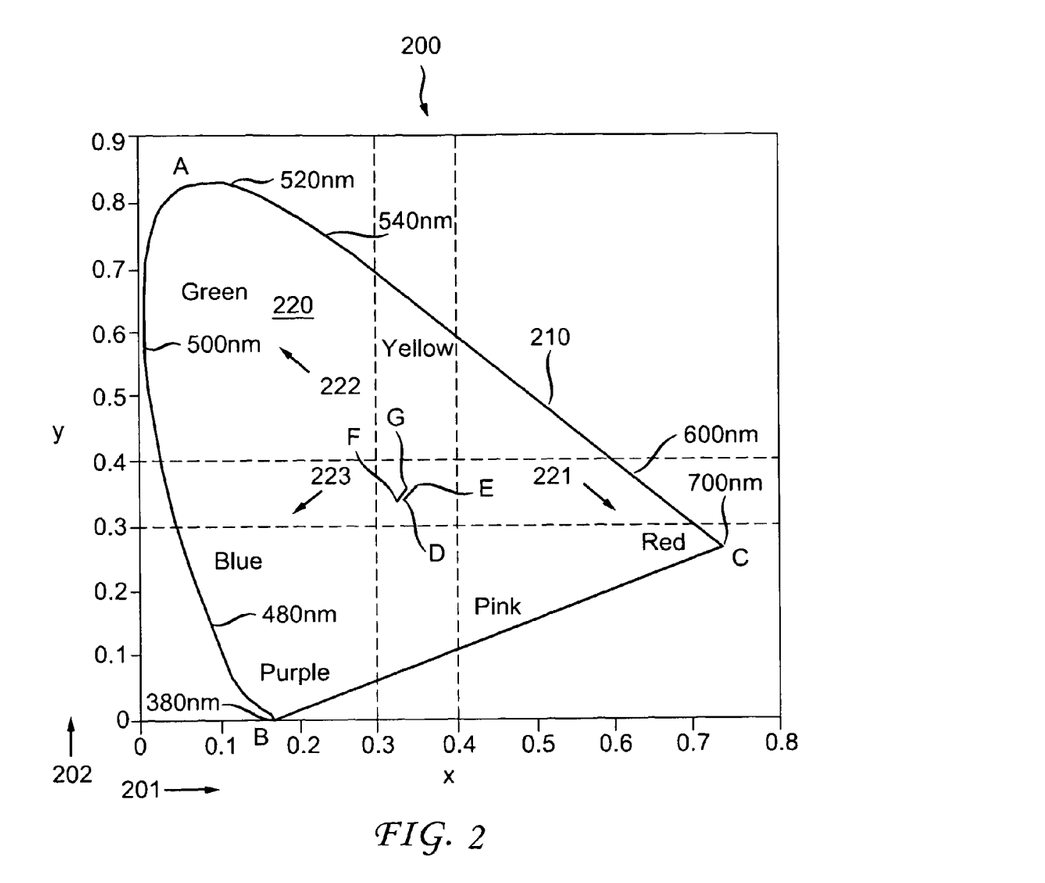
FIG. 2 is the CIE chromaticity diagram, showing the discoloration of two points on the projection screen caused by encoder and decoder filters.

FIG. 2 is the CIE Chromaticity Diagram, from Commission internationale de l'Eclairage proceedings, 1931. Cambridge University Press, Cambridge, Mass., published in 1932. The chromaticity diagram 200 is a diagram of the human visual response in orthogonal coordinate axes formally named 'x' and 'y'. This diagram allows a color (though not its luminance) to be uniquely and unambiguously defined by an {x, y} coordinate pair. The x-axis 201 identifies the 'x' values, and y-axis 202 identifies the 'y' values. The range of colors perceived by most humans are shown bounded by the curve 210 (identified by ABC), which is the "spectral locus" or "monochromatic locus", that is the locus of {x, y} coordinates measured for each wavelength of light perceptible to humans ranging from about 380 nm to 700 nm, as shown in the diagram. The area bounded by the spectral locus 210 is the gamut 220 of human vision. Additionally, for reference, the names of a few of the color regions near the spectral locus 210 are also indicated, such as red region 221, green region 222, and blue region 223.

In this diagram 200, a few exemplary measurement points are indicated. At {0.334, 0.343} is the chromaticity D of the center 141 of the projection screen 140, with the corresponding lens projecting light (in this case, without film 110 being in place) without any filters (e.g., projection filter 151, viewing filter 171) in place. The chromaticity values are measured by a spectrophotometer, e.g., operating in a "colorimeter" or "color meter" mode to obtain {x, y} values (as opposed to its normal mode of obtaining a transmissivity spectrum as a function of wavelength). At {0.347, 0.363} is the chromaticity point E, corresponding to the same measurement-location on the screen, but with encoding filter 151 installed and with the spectrophotometer viewing through the decoding filter 171. (Procedures for these measurements are further discussed in later sections, e.g., in connection with FIG. 5.) In this example, filters 151 and 171 are linear polarizers. A different selection of filters 151 and 171 (e.g., circular polarizers) typically produces a greater discoloration, i.e., a more severe color difference introduced by the presence of these filters.

A similar difference is noted for the chromaticity point F with values at {0.328, 0.339}, which are measured at the bottom-right corner of a projection screen 140 without any filters. With filters 151 and 171 in place for the measurement, the image is discolored or color-shifted to {0.336, 0.355}, chromaticity point G.

The line segment DE illustrates the discoloration at the center of the screen when filters are added, and the line segment FG illustrates a similar discoloration at the corner of the screen. Although the unfiltered endpoints D and E exhibit some difference, the endpoints E and G corresponding to the filters being installed exhibit a greater difference.

Such discoloration arising from the presence of filters 151 and 171 is undesirable. In some cases (not shown) the resulting discoloration arising from the left-eye filters 152 and 172 may be different, in which case, the discoloration would need to be measured separately for each filter combination for each eye.

Further, the use of such filters gives rise to a color shift of comparable magnitude between the center of the screen and the extremities of the screen. In the case of the vector formed by endpoints E→G, the projected image will appear with an orange-yellow cast in the center of the screen (corresponding to endpoint E) and bluer toward the bottom-right corner (corresponding to endpoint G).

Figure 3:
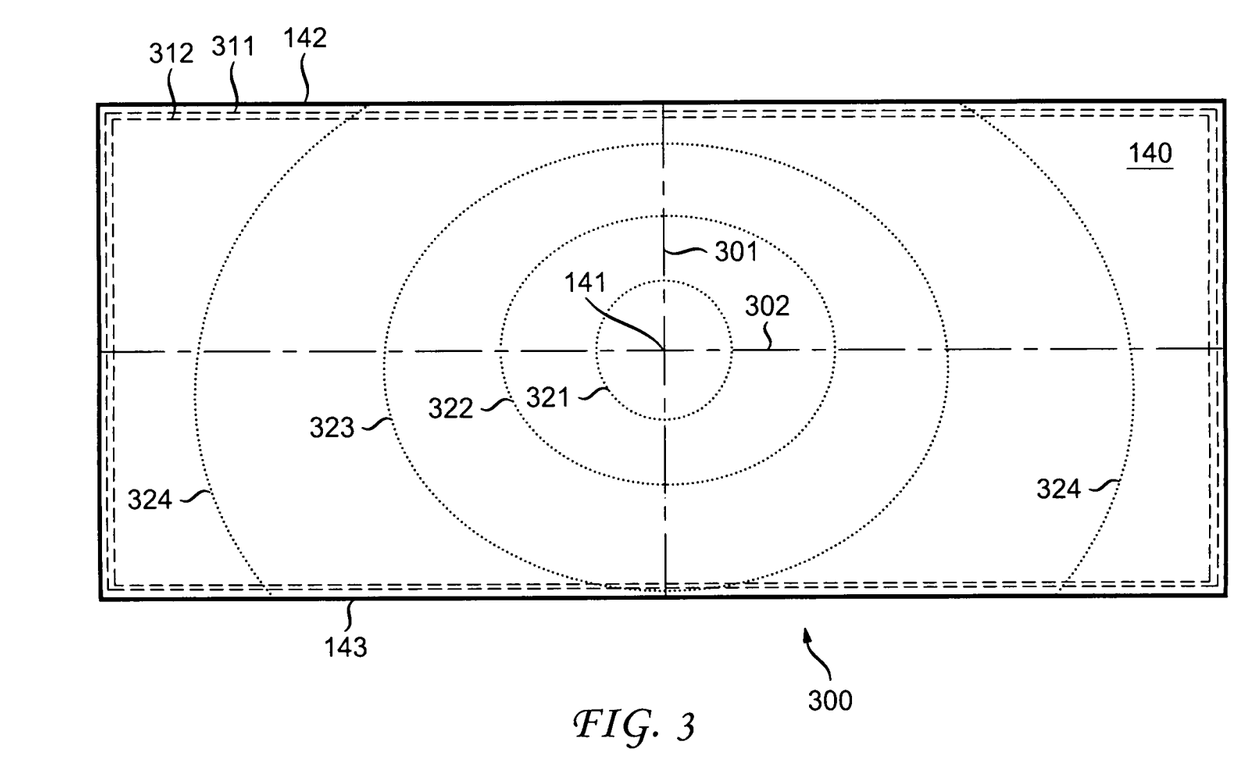
FIG. 3 is a contour map showing spatial-dependency of discoloration on a screen.

FIG. 3 shows the effect of this spatial-dependent discoloration. In on-screen 3D presentation 300, the rectangle 311 represents the projection of a rectangle just inside of the boundary of right-eye image 111 onto screen 140. The projected image is aligned at the top 142 and bottom 143 of the visible portion of screen 140. Vertical centerline 301 and horizontal centerline 302 ideally pass through center point 141. The rectangle 312 represents the projection of a rectangle just inside the boundary of left-eye image 112 onto screen 140. When well aligned, the two projected images 311 and 312 share a common center at screen center 141, and have top and bottom edges substantially overlapping the respective top and bottom edges 142 and 143 of the screen's viewing area.

In this image, contour line 321 is the locus of points surrounding the region at the center of the screen, having the same discoloration value. Contour line 322 is the locus of points having another discoloration value, as are contour lines 323 and 324. Note that contour line 324 exits at the edges of the screen and returns to the screen on the opposite side of vertical centerline 301.

According to FIG. 2, the discoloration within the contour line 321 is an orange-yellow cast, since the color error vector D→E is in the direction of the orange-yellow region of the spectral locus 210. Thus, at the center of the screen (from which points D and E were measured) the projection of image 111 through encoder filter 151 and viewed through decoder filter 171 will appear to have an orange-yellow cast.

Since both of the color error vectors D→E and F→G are in the direction of the orange-yellow region of the spectral locus 210, the projection of image 111 through encoder filter 151 and viewed through decoder filter 171 will appear to have an orange-yellow cast relative to the unfiltered projection. However, in the bottom-right region of the screen, which may be the vicinity of contour line 324, the cast of the projection of image 111 will be bluer, since the vector from center with-filters endpoint E to bottom-right corner with-filters endpoint G is generally in the direction of blue portion 223 of spectral locus 210.

In an embodiment of projection system 100 where the color distortions across the projected images 311 (through the upper lens assembly) and 312 (through the lower lens assembly) are generally symmetrical, generally radial, and generally smoothly varying, (even if less-so than suggested in on-screen 3D presentation 300) then the readings of FIG. 2 indicate that presentation 300 has an orange-yellow cast in the center region around center 141, and a bluer cast in the edge regions near contour line 324.

Embodiments of the present invention correct for this discoloration by altering the density of the color dyes in the print film (i.e., a print produced from a film negative) such that the discoloration is at least partially eliminated or reduced. Aside from altering the color dye density in the film print (e.g., by adjusting exposure during printing), at least a part of the color correction may be done during other stages of film editing/production, including for example, during editing of a digital intermediate, and/or during the write-out of a film negative from the digital version.

Figure 4:
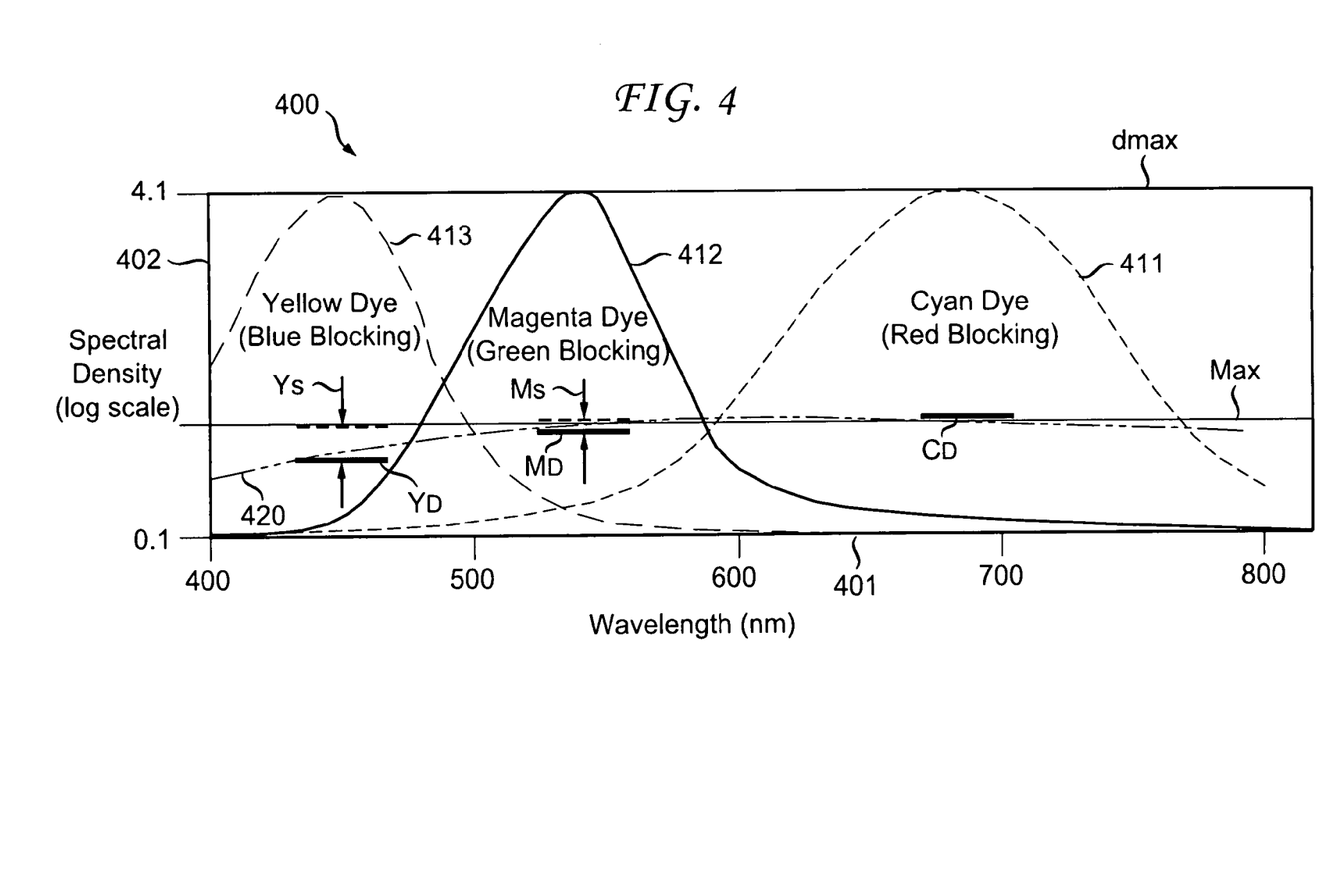
FIG. 4 is a graph showing the density curves of print film dyes in relation to the spectral density of encoder/decoder filter pairs affecting projected color at a point on the screen.

FIG. 4 shows density plot 400, with the logarithm of spectral density plotted along the vertical axis 402, and wavelength along the horizontal axis 401. The example color print film in density plot 400 has a cyan dye that blocks primarily red wavelengths, as shown by the cyan density curve 411; a magenta dye that blocks primarily green wavelengths, as shown by the magenta density curve 412; and a yellow dye that blocks primarily blue wavelengths, as shown by the yellow density curve 413. Each density curves has a minimum spectral density of about 0.1, which is almost transparent, to a maximum density $d_{max}$ of about 4.1, which transmits about 1/10,000 of the incident light (since density is commonly expressed as $\log_{10}$ of the reciprocal of the transmissivity). A color image is printed onto a film as varying densities of these three dyes, where the amount of dye is lower in bright regions, and higher in darker regions. In an image that has saturated regions (e.g., bright red), two of the dyes (e.g., yellow and magenta) will have high or near maximum densities, and the third (e.g., cyan) will have a low density or near transparent. White, or neutral gray regions of an image will have roughly equal density of all three dyes.

Filter response curve 420 shows the effective density of an encoder filter 151 and decoder filter 171, which, in this example, is a right-handed (clockwise) circular polarizer for encoder filter 151 and a left-handed (counterclockwise) circular polarizer for decoder 171. The filter response curve 420 may be obtained by measurements using a spectrophotometer, e.g., by obtaining a complete spectrum of projector light without filters 151 and 171 ("first spectrum"), dividing the first spectrum by a second spectrum of the projector light obtained with filters 151 and 171 in place (as in FIG. 1), and taking the logarithm. For use with filters relying on polarization, screen 140 must preserve polarization, as with a silver screen. Such a metalized screen 140 acts in a manner similar to a mirror, and thus, a right-handed circular polarization projected onto screen 140 is reflected as left-handed circular polarization, which is passed by a left-handed circularly polarized decoder filter 171.

In this example, the filter response curve 420 for filters 151 and 171 shows a lower spectral density at the short wavelength region than at the long wavelength region, which means that the filter combination transmits more blue and green light than red. Thus, an image projected through filter 151 and viewed through filter 171 would appear to have a higher blue component than the red component. To reduce the bluish tint or discoloration in the projected image, an amount of yellow dye (which absorbs or blocks blue light) can be added to the film print for reducing the blue component in the resulting image. The amount of yellow dye that would be required to reduce the extra blue component can be determined from this filter response.

For example, a "yellow dye equivalent" $Y_D$ can be defined as the logarithm of the reciprocal of the integral of a term "X", where X is given by a product of three terms: {the spectrum of the illuminator (not shown), the photopic curve (relative human sensitivity to various wavelengths of light), and the transmissivity of the encoding/decoding filters 151 and 171} divided by the transmissivity corresponding to the yellow dye density curve 413.

$$X = \frac{\text{(illuminator spectrum)(photopic curve)} \text{(transmissivity of encoding/decoding filters)}}{\text{(transmissivity corresponding to yellow dye density curve 413)}}$$

Thus, the yellow dye equivalent $Y_D$ represents the density of yellow dye that is effective for counteracting the effect (color shift) of the filters 151 and 171 (i.e., the amount of yellow dye that can reverse the discoloration effect of the combination of filters 151 and 171), to the extent that the yellow dye can have an effect. Magenta dye equivalent $M_D$ and cyan dye equivalent $C_D$ may be similarly calculated.

For a given configuration of encoding/decoding filters 151/171, a maximum dye equivalent Max can be determined from the respective color dye equivalent values $Y_D$, $M_D$ and $C_D$. In the example of density graph 400, the cyan dye has the highest density dye equivalent $C_D$ compared to those of yellow and magenta.

The difference between the magenta dye equivalent $M_D$ and the maximum dye equivalent Max is magenta density shortfall $M_S$; while the difference between the yellow dye equivalent $Y_D$ and the maximum $M_D$ is yellow density shortfall $Y_S$. In this case, since the cyan dye equivalent $C_D$ is the maximum Max, the cyan density shortfall $C_S$ is zero.

By adding an amount of density of yellow dye corresponding to the yellow density shortfall $Y_S$ and an amount of density of magenta dye corresponding to the magenta density shortfall $M_S$, the discoloration induced by filters 151 and 171 can be substantially eliminated. In this case, since the cyan density shortfall $C_S$ is zero, there is no need to add or adjust the cyan dye density. In other embodiments, color correction can also be done by reducing density in one or more dyes in conjunction with adjusting other dye densities, e.g., by adding or removing neutral density to all dyes to avoid saturation or to modify brightness, if desired.

In general, the number of dyes and amount needed for eliminating discoloration will depend, as a first order effect, on the specific filter configurations (i.e., combination of the filter/polarizer in the projection lens and viewing glasses). It is possible that adjustment in the density of only one dye (as opposed to two or three) will be sufficient to substantially eliminate or significantly reduce discoloration to acceptable levels.

In general, filter response curve 420 applies to a normal angle of incidence through the filters 151 and 171. However, various points on screen 140 will have different angles of incidence relative to encoding filter 151, and this can be the source of a majority of the spatial variation in the discoloration as shown in FIG. 3. Rather than performing such elaborate calculations for each region, a lookup table may be pre-calculated to provide the values for added dye densities necessary to compensate for a particular discoloration value (or color shift due to filters' effects) at a given {x, y} in chromaticity diagram 200. In this way, the continuously varying nature, or spatial-dependency of the discoloration across screen 141 (as shown in FIG. 3) can be corrected without excessive computation. It is understood that a conversion of measurements {x, y} into CIE L*a*b* color space, as defined in Section 4.2 of Publication 15.2 (1976 or later) by the Commission Internationale d'Eclairage, would, because of its perceptive uniformity, allow color errors having the same magnitude and direction to have substantially the same dye correction.

In some embodiments, the spatial variation of the discoloration may be ignored, and only a single set of dye density shortfalls (e.g., $Y_S$ and $M_S$) applied to the whole of the image 111.

In still other embodiments, whether or not the spatial variation of the discoloration may be ignored, color errors in different regions of gamut 220 may have substantially different color errors (even in L*a*b* color space), dye corrections for a point on the screen may need to be determined with respect to more than one region in gamut 220. For example, as shown in FIG. 2, color errors DE and FG differ not only in their origin points D and F as a matter of their different locations on-screen, the vectors are not parallel and are slightly different magnitudes. (i.e., they represent slightly different color errors). Error vectors measured elsewhere in gamut 220 may likewise be of different direction and magnitude.

If the filters 151 and 171 provide a spectrally flat attenuation (or in a more complex situation, if all color dye equivalent values $Y_D$, $M_D$ and $C_D$ equal maximum dye equivalent Max), then there would be no discoloration due to the filters at that point on the screen: the filters would have a "neutral" density.

Figure 5:
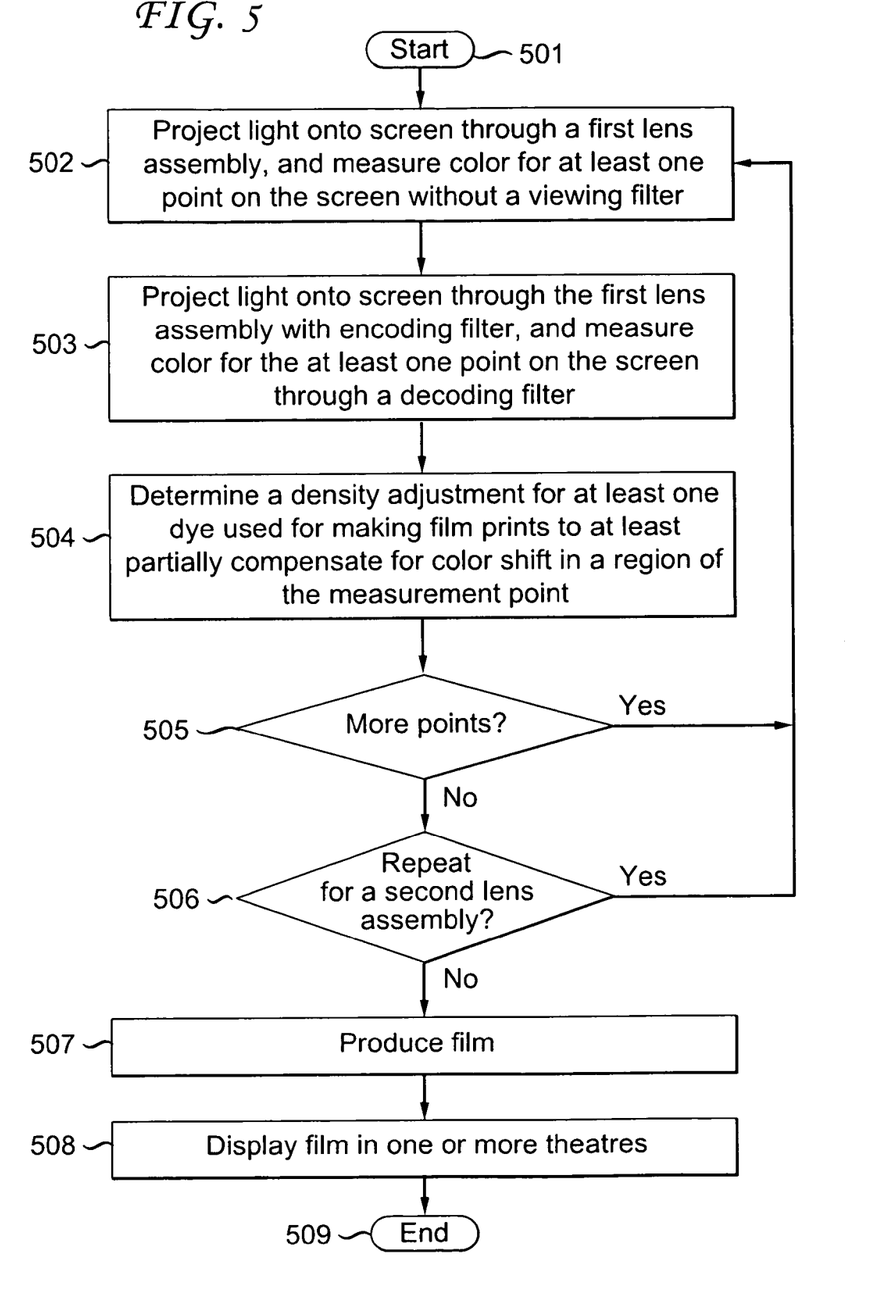
FIG. 5 is a flowchart for a process to create a color corrected 3D film.

FIG. 5 shows color correction process 500, which begins at start step 501 during which the film formats (e.g., aspect ratio, image size, encoding filters, decoding filters, screen type, etc.) are established. Lookup tables for determining the amount of additional dye densities corresponding to the correction at a particular {x, y} (or ΔC if using L*a*b* space) of a chromaticity error or discoloration value (e.g., the error or color shift represented by the directed line segment D→E in FIG. 2) may also be built at this stage to simplify calculations in subsequent steps. For example, a lookup table may provide a correlation between the amounts of one or more dyes that would be needed to compensate for the difference in chromaticity caused by one or more filters in the optical path of the projection system and the viewer.

In the CIE representation of FIG. 2, the amount of density of a dye needed to compensate for a given discoloration, e.g., represented by line segment D→E, varies with the location of {x,y} in the diagram. Thus, a given discoloration value or color error in the green region may correspond to a first dye density amount, but the same discoloration value in the purple region may correspond a second dye density amount that is different from the first amount.

In an alternative embodiment, a lookup table may be built in CIE L*a*b* color space (or other appropriate color space), in which case, the discoloration value expressed in "a*b*" coordinates, would be sufficient to identify an amount of dye density correction (or modification) applicable through the L*a*b* color space. As an example, a color error in "a*b*" coordinate in L*a*b* space can be obtained by converting the endpoint E in {x,y} coordinate (measured with colorimeter) to L*a*b* color space and subtracting from it the measured endpoint D converted to L*a*b* color space. This error in "a*b*" coordinate is also designated as ΔC, or referred to as a CIE chroma distance metric. Note that a change in luminance (L*) is not being corrected—the addition of the various filters will result in a dimmer image which may be compensated for by increasing the output of the illuminator (not shown).

In step 502, 3D projection system 100 is turned on and allowed to come into equilibrium. 3D projection system 100 projects light onto the screen 140 through the upper half of lens 130 (e.g., for right-eye images), which can be referred to as a first lens assembly. In this configuration, encoding filter 151 is not installed in the first lens assembly, and the lower half of lens 130 (e.g., for left-eye images) is blocked. A spectrophotometer is placed at a location suitable for viewing screen 140, and a measurement of the chromaticity for at least one point or location on the screen (e.g., center point 141) is taken by directing the spectrophotometer towards that point. The spectrophotometer should be of the 'spot' type, such that its reading (in colorimeter mode) represents the luminance of the portion of the screen (representing a sampling area around the measurement point) at which it is aimed.

In step 503, right-eye encoding filter 151 is installed after the first lens assembly, and right-eye decoding filter 171 is placed in front of the spectrophotometer, in an orientation that allows transmission of the projected right-eye image (i.e., similar to the orientation used by an audience member 160). The decoding filter 171 should be positioned such that substantially all the light detected by the spectrophotometer would have passed through decoding filter 171. A colorimetry reading is made and recorded for at least that point or location on the screen.

Note that in some embodiments, the information about the discoloration may be obtained without actually performing the measurements of steps 502 and 503. For example, if the absorption spectra of the filters are provided, then the attenuation of the illuminator's output spectrum can be computed and a resulting color shift computed. This amounts to a computer simulation of the measurements. Alternatively, some filter vendors may perform measurements (or simulations) on their own, and supply the discoloration values for their products. Furthermore, information relating to dye density adjustment(s) effective for reducing discoloration can also be obtained through trial-and-error, e.g., by incorporating an initial amount of density adjustment for one dye and observing whether a test film incorporating the adjustment leads to a reduced discoloration, and repeating the procedure with additional amounts of adjustments for each of the dyes.

In step 504, a modification to the density or density adjustment (e.g., an additional density) of at least one dye used for producing a film print is determined based on the measurements of steps 502 and 503 (or equivalent information otherwise obtained), to at least partially compensate for the color shift in a region of the projected image space near the measured point. This can be done, for example, by referring to the lookup table prepared in step 501. This modification to the dye density represents a dye density adjustment, e.g., an amount of dye density to be added, to the density of an image frame of a film print, such that the resulting film print would be compensated for discoloration arising from the projection filter and viewing glass filter. If the discoloration measurements represent discolorations that occur in different regions of gamut 220, then the dye density adjustment may be additionally dependent upon the colors in the individual images.

In the above discussion of steps 502 and 503, the example refers to measurements in the "colorimeter" mode. In another example, the modification of dye densities can be determined by using the spectrophotometer in a different mode, i.e., by recording a complete spectrum of the projected light near the current point on the screen (with filters in step 503) and dividing that by a complete spectrum of the projected light near the current point (without filters in step 502), to get a transmissivity spectrum of the filter set 151 and 171 (the $\log_{10}$ of the reciprocal of this transmissivity spectrum would form curve 420), after which the determination of the appropriate additional dye densities would be made in the manner previously described in conjunction with FIG. 4.

Generally, the added dye density or density adjustment is determined prior to recording the images to a film negative. If added density is desired in the final film print, then increases in print dye density are produced as corresponding decreases in negative dye density. In particular, the portion of added density that varies spatially across the film, or varies from eye to eye, must be handled in this way.

However, in an alternative embodiment, the portion of increases in print dye density not due to spatial variation in discolorations or eye-specific filters (i.e., if the discoloration caused by filters 151 and 171 differs from that caused by filters 152 and 172), may be implemented by increasing the exposure of the individual dyes during the printing process, rather than as changes to the dye density in the negative.

In step 505, a determination is made as to whether additional points or locations on screen 140 should be characterized. In an embodiment where the spatial variation of discoloration is slight or otherwise to be ignored, a measurement at one point (i.e., measurements at steps 502-503) will be sufficient. However, if more precision across the screen 140 is desired, additional color measurements should be performed by repeating steps 502-503 at different locations. Once multiple points on the screen have been measured, the image modifications in step 504 may be made on the basis of interpolated, extrapolated, or otherwise modeled or estimated discoloration values based on measured values at nearby points or locations. Alternatively, a density adjustment for any given point or location on the screen can also be obtained by interpolation and/or extrapolation of density adjustments available for other points or locations of the screen.

In step 506, a determination is made as to whether a different set of measurements and corrections is needed for the other (left) eye image 112, i.e., using the lower lens half or projection lens assembly for projecting the left-eye images. This would be the case if encoding filter 152 and/or decoding filter 172 has a substantially different response compared to the filter combination 151 and 171 in the other lens assembly.

In step 507, a film is produced based on the modification(s) in dye density determined in step 504 for one or more dyes and for the respective right- and/or left-eye images and the content of the film. The film can be produced by recording the stereoscopic images on a film negative or positive by incorporating the dye density adjustment(s) to the images of the original (uncorrected) film, and producing one or more film prints from the negative or positive. For example, if the film content originally calls for a certain dye density value V1 in a region, then a negative film (if used) would be recorded by modifying V1 by an amount determined from step 504 for that dye in that region. Note that for each dye density adjustment determined for a given eye's image, the same adjustment will be applied to the entire set of images for that eye. A film is then printed based on the negative.

In an alternative embodiment, instead of incorporating the density adjustments to images in the film negative, some or all of the increased print dye density can be produced by increasing the exposure of each dye during film printing. The print is then developed. In another embodiment, prior to producing the film negative (or positive), information relating to the dye density adjustments can be stored in digital form, e.g., as digital intermediate, for use in producing the film negative/positive at a later time.

In step 508, the finished print is distributed to one or more theatres with similar projection lens systems, and the resulting film presentations will have reduced discoloration compared to film prints that have not been color-corrected. If measuring steps 502 and 503 are conducted in a plurality of theatres and the results for similar locations are combined (as in an average), then step 504 may produce a single film negative sufficiently representative of each of the plurality of theatres, and duplicate prints made in steps 507 may be provided to each of the theatres.

It is also possible that film print distribution in step 508 be extended to additional theatres, without actual measurements in these additional theatres, e.g., if these theatres have projection and viewing filters combination similar to those for which measurements have been obtained. Color correction process 500 concludes in step 509.

Figure 6:
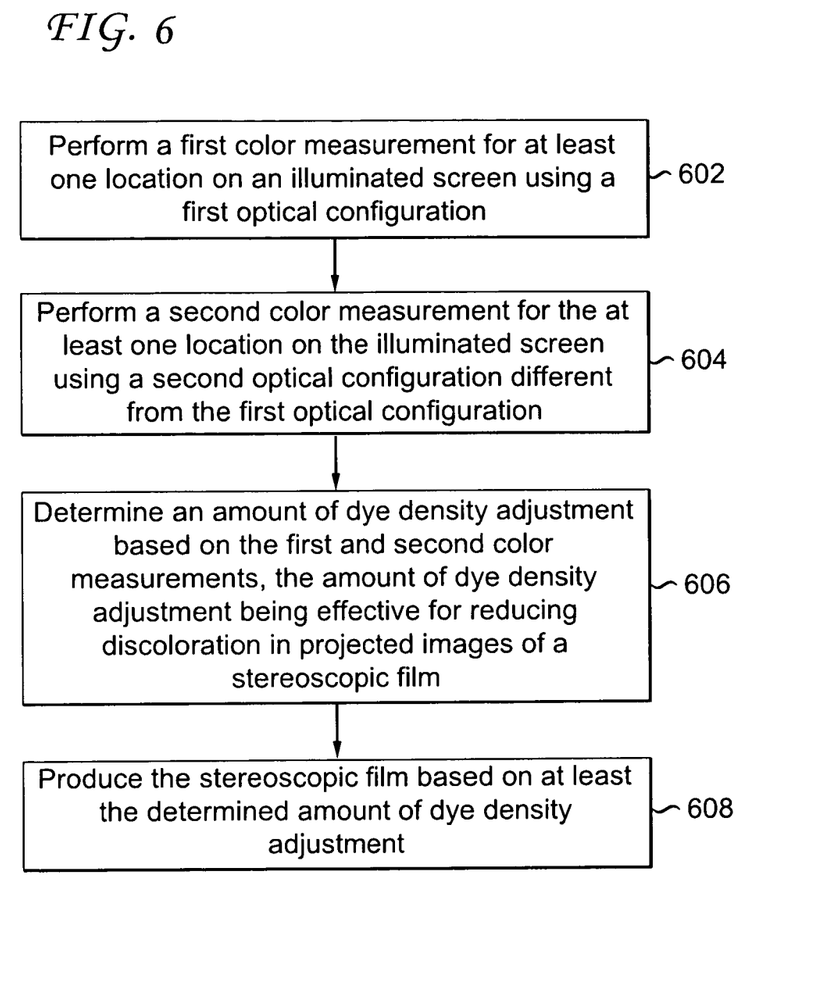
FIG. 6 illustrates another embodiment of a process for producing a stereoscopic film with color correction.

FIG. 6 illustrates another embodiment of a method 600 for producing a stereoscopic film with color correction, e.g., suitable for use with system such as system 100 of FIG. 1. The color-corrected stereoscopic film will exhibit reduced discoloration or color shift arising from one or more optical components in the projection system.

In step 602, a first color measurement is performed for at least one location (e.g., a point or a certain area defined by a spectrophotometer) on an illuminated screen using a first optical configuration relating to illumination and measurement arrangements. For example, similar to that described in step 502 of FIG. 5, the screen is illuminated by projector light through one half of a dual-lens assembly, i.e., the lens assembly used for projecting one of a stereoscopic image pair (with the other half of the dual-lens being blocked). If the upper lens assembly is used in this step, measurement is performed without encoding filter (e.g., filter 151) and without the viewing filter 171 in place.

In step 604, a second color measurement for that location on the illuminated screen is performed using a second optical configuration, with the illumination and measurement arrangements being different from that in step 602. In this case, an encoding filter (e.g., filter 151, which may be a polarizer) is installed in the optical path of the projector light incident on the screen, such that the light illuminating the screen becomes polarized, e.g., circularly polarized. Furthermore, this second measurement is done with a decoding filter (e.g., filter 171, which may be a polarizer) between the screen and the spectrophotometer or colorimeter. As previously described, the encoding filter and the decoding filter are appropriately polarized and oriented for viewing only one image of a stereoscopic image pair.

In step 606, an amount of dye density adjustment, which can be used for producing a color-corrected stereoscopic film with reduced discoloration in the projected images, is determined based on the first and second color measurements. Depending on the specific film medium (e.g., film negative/positive or film print) and processing stage in producing the stereoscopic film, the density adjustment to be applied to the film medium may correspond to a density increase or decrease. For example, the difference between the first and second color measurements is indicative of a color shift or discoloration that would be perceived by a viewer of a projected film. Based on this difference in color measurements in steps 602 and 604, the amount of at least one dye density adjustment for use in the film print to compensate for such discoloration (e.g., by reducing or eliminating the color difference) can be determined. As previously discussed, such determination can be done by using lookup tables listing the amount of additional dye densities (e.g., yellow, magenta and cyan) necessary for correcting certain color error at a particular point $\{x, y\}$ in the CIE chromaticity diagram, or in another color space. Furthermore, color measurements can be done for a plurality of locations on the screen for determining corresponding dye density adjustments for these different locations.

In step 608, a stereoscopic film is produced based on at least the amounts of dye density adjustments determined from the measurements. The color-corrected film will result in reduced discoloration in the projected images compared to images from an original or uncorrected film. Although it may be desirable to produce a stereoscopic film by incorporating dye density adjustment(s) in one or more dyes to completely eliminate discoloration, it is also possible that dye density adjustment(s) be incorporated in the film simply to reduce discoloration to a certain desired level, i.e., to partially compensate for discoloration in the projected film.

During the various stages of producing the stereoscopic film to be used for projection or presentation, the dye density adjustment can be recorded on a film negative or positive. Alternatively, information relating to the amount of dye density adjustment (can be density increase or decrease) for one or more different color dyes that is effective for reducing or eliminating color shifts in stereoscopic images can be recorded or stored in digital format in a memory. The stored information can be retrieved at a later time for use in producing the stereoscopic film that is compensated for color shifts arising from one or more optical components in the projection system.

As previously mentioned, in some cases, information relevant to the determination of dye density adjustments can be obtained without actually performing color measurements, e.g., if information regarding discoloration are provided, or obtainable through simulations. Furthermore, information relating to dye density adjustment effective for reducing discoloration can also be obtained through trial-and-error, e.g., by estimating an initial amount of density adjustment, producing a test film based on that estimated amount, and observing whether the test film leads to a reduced discoloration.

Thus, in another embodiment, a method for producing a color-corrected stereoscopic film can include obtaining information relating to an amount of dye density adjustment effective for reducing discoloration in projected images of the stereoscopic film, and producing the stereoscopic film based on at least the information relating to the amount of dye density adjustment.

Examples discussed above are meant to be illustrative of various aspects of the present principles, and one or more features can also be used in different combinations or adapted for use in other systems of applications. Thus, the color corrections of the present method can be applied directly to the digital image files occurring in a modern digital intermediate process before or as they are written out to film in a film recorder.

Embodiments of the present invention may also be applied to synchronized dual film projectors (not shown), where one projector projects the left-eye images and the other projector projects the right-eye images, each through an ordinary projection lens (i.e., not a dual lens such as dual lens 130), but still with respective projection filters such as filters 151 and 152 of FIG. 1.

Another embodiment of the invention can provide a system with at least one processor and associated computer readable medium (e.g., hard drive, removable storage, read-only memory, random accessible memory, and so on). Program instructions are stored in the computer readable medium such that, when executed by one or more processors, will cause one or more steps of a method to be implemented according to one or more embodiments discussed above, e.g., for automated color measurements and/or computation of one or more dye density adjustments for used in producing a color-corrected stereoscopic film.

While the forgoing is directed to various embodiments of the present invention, other embodiments of the invention may be devised without departing from the basic scope thereof. Thus, the appropriate scope of the invention is to be determined according to the claims.

What is claimed is:

1. A method for producing a stereoscopic film for use with a 3-dimensional (3D) projection system, comprising:
   obtaining information relating to an amount of dye density adjustment effective for reducing discoloration in projected images of the stereoscopic film; and
   producing the stereoscopic film based on at least the amount of dye density adjustment;
   wherein the information relating to the amount of dye density adjustment is obtained from at least one of: color measurement, estimation, and simulation based on information for one or more optical components in the projection system; and
   wherein the stereoscopic film comprises a first set of images and a second set of images, each image for the first set of images forming a stereoscopic image pair with an associated image from the second set of images; and the information relating to the amount of dye density adjustment includes information relating to a first amount of dye density adjustment applicable to the first set of images and information relating to a second amount of dye density adjustment applicable to the second set of images.

2. A method for producing a stereoscopic film for use with a 3-dimensional (3D) projection system, comprising:
   obtaining information relating to an amount of dye density adjustment effective for reducing discoloration in projected images of the stereoscopic film; and
   producing the stereoscopic film based on at least the amount of dye density adjustment;
   wherein the information relating to the amount of dye density adjustment is obtained from at least one of: color measurement, estimation, and simulation based on information for one or more optical components in the projection system; and
   wherein the method further comprises:
   (a) performing a first color measurement for at least one location on an illuminated screen using a first optical configuration;
   (b) performing a second color measurement for the at least one location on the illuminated screen using a second optical configuration different from the first optical configuration; and
   (c) determining the amount of dye density adjustment based on the first and second color measurements.

3. The method of claim 2, further comprising:
   storing information relating to the determined amount of dye density adjustment in digital format for use in producing the stereoscopic film.

4. The method of claim 2, further comprising:
   producing the stereoscopic film based on at least the determined amount of dye density adjustment.

5. The method of claim 4, further comprises incorporating at least the determined amount of dye density adjustment in at least one set of stereoscopic images in the stereoscopic film.

6. The method of claim 2, wherein step (c) further comprises determining a first amount of dye density adjustment for a first dye, a second amount of dye density adjustment for a second dye, and a third amount of dye density adjustment for a third dye, wherein the first, second and third dyes each have maximum spectral density at different wavelengths.

7. The method of claim 6, wherein the first dye is a yellow dye, the second dye is a magenta dye, and the third dye is a cyan dye.

8. The method of claim 2, wherein the stereoscopic film comprises a first set of images and a second set of images, each image for the first set of images forming a stereoscopic image pair with an associated image from the second set of images, and the method further comprises:
   performing steps (a), (b) and (c) using a first lens assembly in the 3D projection system for determining at least a first amount of dye density adjustment applicable to the first set of images; and
   performing steps (a), (b) and (c) using a second lens assembly in the 3D projection system for determining at least a second amount of dye density adjustment applicable to the second set of images, the second lens assembly being different from the first lens assembly.

9. The method of claim 2, further comprising:
   repeating steps (a), (b) and (c) for a plurality of locations on the illuminated screen; and determining an amount of dye density adjustment for a different location on the screen based on the first and second color measurements obtained for the plurality of locations.

10. The method of claim 2, wherein the second optical configuration includes a projection filter that is absent in the first optical configuration.

11. The method of claim 10, wherein step (b) comprises passing light through the projection filter for illuminating the screen, and performing the first color measurement through a viewing filter; and step (a) is performed in the absence of the projection filter and the viewing filter.

12. The method of claim 10, wherein the projection filter is selected from one of a linear polarizer, a circular polarizer and an interference comb filter.

13. The method of claim 10, wherein the projection filter is a first polarizer, and the viewing filter is a second polarizer oriented to allow transmission of illuminating light that has passed through the first polarizer and has reflected off the screen.

14. The method of claim 1, further comprising:
obtaining information relating to amounts of dye density adjustment for a plurality of locations on a screen for projecting the stereoscopic film.

15. A plurality of images suitable for use with a three-dimensional (3D) projection system, comprising:
a first set of images and a second set of images, each image in the first set of images forming a stereoscopic image pair with an associated image in the second set of images;
wherein at least one of the two sets of images incorporates at least one dye density adjustment for at least partially compensating for discoloration resulting from at least one optical component of the 3D projection system.

16. The plurality of images of claim 15, wherein each of the two sets of images incorporates different dye density adjustments.

17. The plurality of images of claim 15, wherein the at least one dye density adjustment is determined from at least two color measurements performed under different optical configurations of the projection system.

18. The plurality of images of claim 15, wherein the at least one dye density adjustment is obtained from at least one of: color measurement, estimation, and simulation based on information for one or more optical components in the projection system.

19. The plurality of images of claim 15, wherein the at least one optical component is selected from one of a linear polarizer, a circular polarizer and an interference comb filter.

* * * * *